(12) United States Patent
Kubota

(10) Patent No.: US 6,538,655 B1
(45) Date of Patent: Mar. 25, 2003

(54) IMAGE PROCESSING SYSTEM AND IMAGE PROCESSING METHOD

(75) Inventor: Hiroshi Kubota, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/486,644

(22) PCT Filed: Aug. 28, 1998

(86) PCT No.: PCT/JP98/03867

§ 371 (c)(1), (2), (4) Date: May 16, 2000

(87) PCT Pub. No.: WO99/12129

PCT Pub. Date: Mar. 11, 1999

(30) Foreign Application Priority Data

Aug. 29, 1997 (JP) .............................. 9-234812

(51) Int. Cl.[7] .............................. G06T 15/00
(52) U.S. Cl. ...................................... 345/474
(58) Field of Search .............. 345/473, 474, 345/475; 703/2, 7, 102

(56) References Cited

U.S. PATENT DOCUMENTS 6,388,670 B2 * 5/2002 Naka et al. ................. 345/474
6,421,056 B1 * 7/2002 Nishiumi et al. ........... 345/474
6,480,194 B1 * 11/2002 Sang'udi et al. ............ 345/440

OTHER PUBLICATIONS

Tu, et al., "Perceptual Modeling for the Behavioral Animation of Fishes," Proceedings of the Second Pacific Conference on Computer Graphics and Applications, pp. 185–200, Aug. 26, 1994.

Blumberg, et al., "Multi–Level Direction of Autonomous Creatures for Real–Time Virtual Environments," Computer Graphics Proceedings, pp. 47–54, Aug. 6, 1995.

Cavusoglu, et al., "Animating Multiple Figures Using a Language Interpreter," Proceedings of the Mediterranean Electrotechnical Conference, pp. 1219–1221, Apr. 12, 1994.

* cited by examiner

*Primary Examiner*—Phu K. Nguyen
(74) *Attorney, Agent, or Firm*—Finnegan, Henderson, Farabow, Garrett & Dunner, L.L.P.

(57) ABSTRACT

An image processing system for generating an enjoyable moving picture of an object simulating a live fish moving in a three-dimensional virtual space, comprising a calculating means (steps S1–S13) for simulating the movement of the object with reference to the target point of the movement of the object and calculates image data and a means (step S14) for displaying the image data.

20 Claims, 16 Drawing Sheets

(a)

(b)

○ JOINT OF BONES (POSITION)

□ NEW JOINT OF BONES (POSITION)

(TOP VIEW: TILED TEXTURE)

PARALLEL PROJECTION OF TEXTURE ON A MODEL

IMAGE PROCESSING SYSTEM AND IMAGE PROCESSING METHOD

TECHNICAL FIELD

The present invention relates to an image processing system and image processing method. More particularly, the present invention relates to the image processing of an enjoyable game where such a creatures as a live fish can be moved in a state close to nature in a three-dimensional virtual space so as to enjoy the creature just like an actual creature, and interaction between the movement of the creature and the player is implemented.

BACKGROUND ART

Along with the recent advancements of computer graphics technology, simulation systems and game machines are now being widely used in both businesses and homes. Recently in the field of game machines, an enjoyable game for enjoying such a creature as a live fish as an artificial pet on a monitor by moving the creature in a virtual game space is proposed.

A system for this enjoyable game generally comprises a CPU for graphics processing and a monitor. In the case of a fish, for example, position information on the movement of the fish in a tank set in a virtual game space is patterned in advance, and hundreds of patterns are determined. The CPU selects the position information of movement which is patterned according to the situation, calculates a position of the object simulating a fish based on this information, interpolates the movement by matrix (rotation, movement) based on the motion capture, and regenerates and displays the images. In the case of an enjoyable game simulating a plurality of fish moving in ocean current, the positions and movements of the plurality of fish are calculated and displayed based on specific information representing the environment, that is, ocean current.

In the case of the above mentioned conventional system for an enjoyable fish game, however, the position information of movement of the mobile object is merely patterned or the position information is merely calculated along with such specific information as ocean current, and in the case of movement regenerated by the conventional predetermined matrix, such as motion capture, sufficient naturalness to express movement of a live creature is lacking. In other words, the conventional method is limited to express movement of a live creature. The player merely looks at a monitor, which is an artificial tank, and there is no interaction seen in nature, such as a fish in a tank approaching or swimming away, depending on the action of the player.

With the foregoing in view, it is an object of the present invention to provide a realistic enjoyable game which can express the movement of such a creature as a fish realistically and naturally in a three-dimensional virtual space, and allows for the player to enjoy the game as if an actual creature exists.

Another object is to provide an enjoyable game which can express interaction which actually occurs in nature, between the mobile object simulating such a creature as a fish in a three-dimensional virtual space and the player, so that reality can be improved along with enhancing amusement.

DISCLOSURE OF THE INVENTION

To achieve the above objects, an image processing system of the present invention is for generating images to enjoy the movement of a mobile object simulating a living creature by moving the mobile object in a three-dimensional virtual space, comprising movement calculation means for calculating image data by simulating the movement of the mobile object with reference to the target point of the movement of the above mobile object, and display means for displaying the image data calculated by the movement calculation means.

For example, the mobile object is a fish in a virtual tank. In this case, it is preferable that the above display means is a monitor for displaying the above image data as images, and is comprised of a tank disposed on the front face of the monitor and a sensor disposed on the front face of the tank for detecting interactive instruction information from a player to the above mobile object. This sensor is, for example, a matrix sensor where infrared sensors, which the player can touch to input information, are arranged in the matrix.

Preferably the above movement calculation means has target point setting means for setting the above target point. This target point setting means has a table where discrete values are set in advance, for example, so as to select a discrete value from the table. In this case, it is preferable that the above target point setting means updates the target point by reselecting the discrete value in every predetermined number of frames of the display image of the monitor. The above target point setting means can be comprised of means for judging whether the player has input instruction information to the above sensor, and means for determining the target point based on the instruction information if it is judged that the player has input instruction information. The above instruction information is, for example, a signal for the player to call the fish or an operation for the player to feed the fish.

Preferably the above movement calculation means comprises fish body position calculation means for calculating the fish body position of the fish in the three-dimensional virtual space according to the target point set by the target point setting means, virtual bone position calculation means for calculating a plurality of virtual bone positions set in the fish using the above position sequentially from head to tail, vertex position calculation means for calculating each vertex position of the polygons simulating the above fish body using the above positions of the virtual bones, and image data generation means for generating the above image data according to the above respective vertex positions.

More preferably, the above target point setting means has target point correction means for correcting the set value of the target point according to the virtual size of the tank.

The above movement calculation means may further comprise atmosphere information calculation means for calculating atmosphere information of the environment to express the fish swimming in the virtual tank, and information generation means for generating information to add the atmosphere information to the image data of the fish. The above atmosphere information is, for example, waves in the tank and light waves moving in the water of the tank. In this case, the above virtual tank has a simple model of the waves, this simple model is a virtual model of a rectangular parallelepiped where three sides are predetermined values respectively, weight is a predetermined value, and each of the four corners of the base are supported with a spring respectively, and the above atmosphere information calculation means calculates the above atmosphere information where the movement of waves is simulated by changing the spring constants of the above springs at each interrupt.

An image processing method of the present invention, on the other hand, is a method for generating images to enjoy the movement of a mobile object simulating a living creature by moving the mobile object in a three-dimensional virtual space, wherein a target point of the movement of the mobile object is set, the movement of the mobile object is simulated with reference to the target point so as to calculate the image data, and the calculated image data is displayed.

Another aspect of the present invention is an image processing system for generating the moving state of a cubic mobile object having a longitudinal direction as images by moving the mobile object in a three-dimensional virtual space, comprising movement calculation means for simulating the movement of the above mobile object with reference to the target point of the movement of the mobile object so as to calculate image data, and display control for displaying the images calculated by the movement calculation means.

Another aspect of the present invention is wherein the above movement calculation means calculates the positions of the plurality of virtual joints and simulates the movement of the mobile object according to the positions of the virtual joints so as to calculate image data. Another aspect is wherein the above movement calculation means further comprises target point setting means for setting the above target point, mobile object position calculation means for calculating the position of the mobile object in the three-dimensional virtual space according to the set target pint, virtual joint position calculation means for calculating and determining the positions of the virtual joints of the mobile object using the above positions sequentially from the virtual joint at the moving direction side, vertex position calculation means for calculating the respective vertex positions of the polygons forming the mobile object using the positions of the above virtual joints, and image data generation means for generating the above image data according to the above respective vertexes.

PREFERRED EMBODIMENT OF THE INVENTION

An embodiment of the present invention will now be described with reference to the accompanying drawings.

Figure 1:
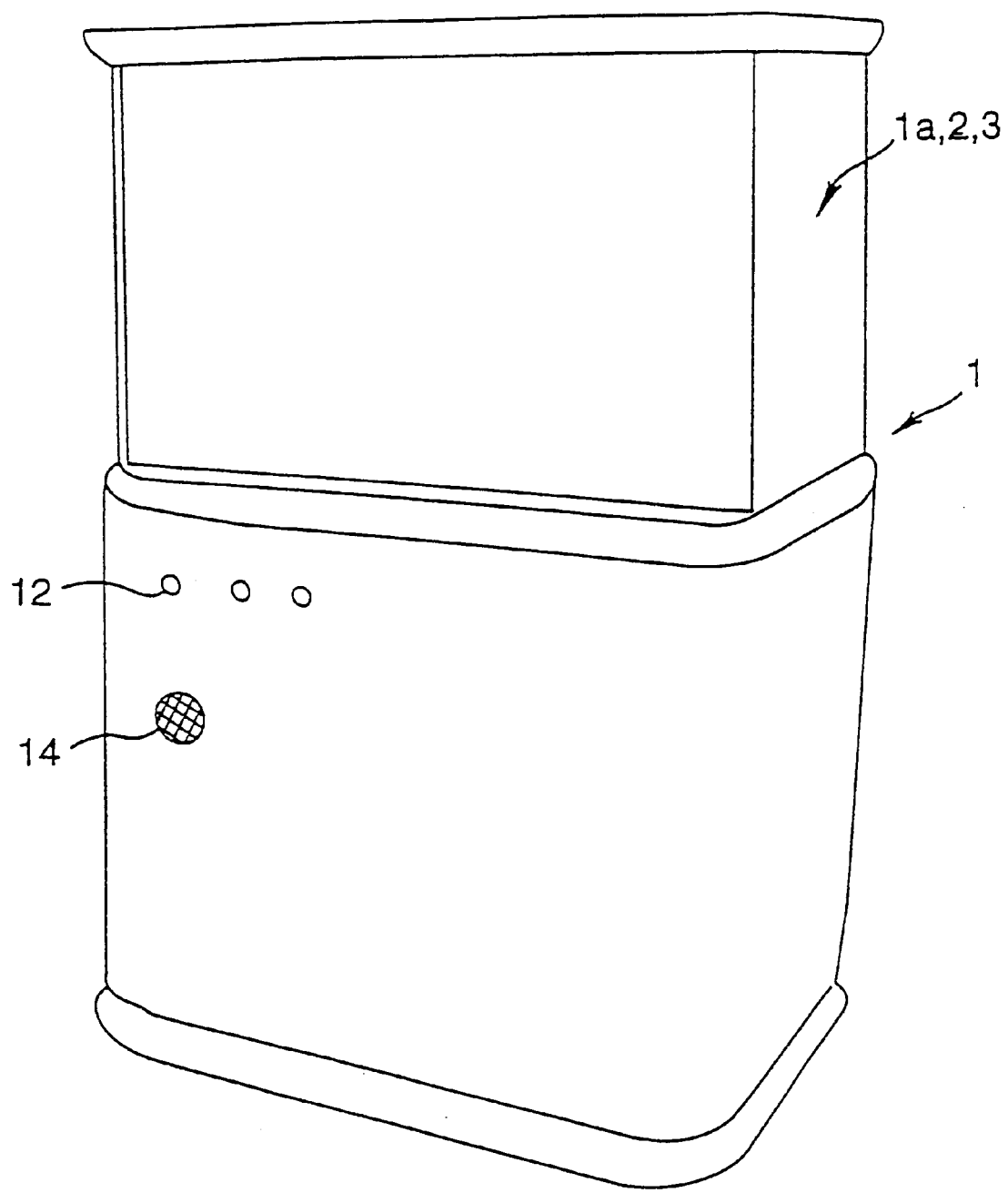
FIG. 1 is a general perspective view of an image processing system in accordance with one embodiment of the present invention.

FIG. 1 shows an example of a configuration of an image processing system in accordance with the embodiment. This image processing system is for executing an enjoyable game of tropical fish which move in a virtual game space.

As FIG. 1 shows, the image processing system comprises a monitor 1a for displaying images, the main body 1 for processing images to be displayed on the monitor 1a, a tank 2 which is mounted on the monitor 1a, and a sensor 3 which is mounted on the front face of the tank 2.

The main body 1 has a game processing board 10, speaker 14, and various output devices 12 in a casing which is formed as a rectangular parallelepiped with the width longer than the height. The electric configuration and operation of these elements will be described later.

The monitor 1a is a display device having a display screen with a width that is longer than the height, and is placed on the main body 1. The monitor 1a displays fish (tropical fish in this case) represented by polygons and background images. The size and shape of the display screen of the monitor 1a is not limited to one with a width that is longer than the height, but various sizes and shapes can be used depending on the intended use.

The tank 2 is mounted to create an atmosphere of an actual tank, where water is expressed by generating bubbles. This tank 2 also has a shape, where the width is longer than the height and the depth is shallow, so as to match the shape of the monitor 1a, and is made of transparent glass. The tank 2 is mounted on the front face of the monitor 1a, as shown in FIG. 2, and a state to enjoy fish in an actual tank can be artificially created by viewing the fish and background displayed on the screen of the monitor 1a from the tank 2 side.

Figure 2:
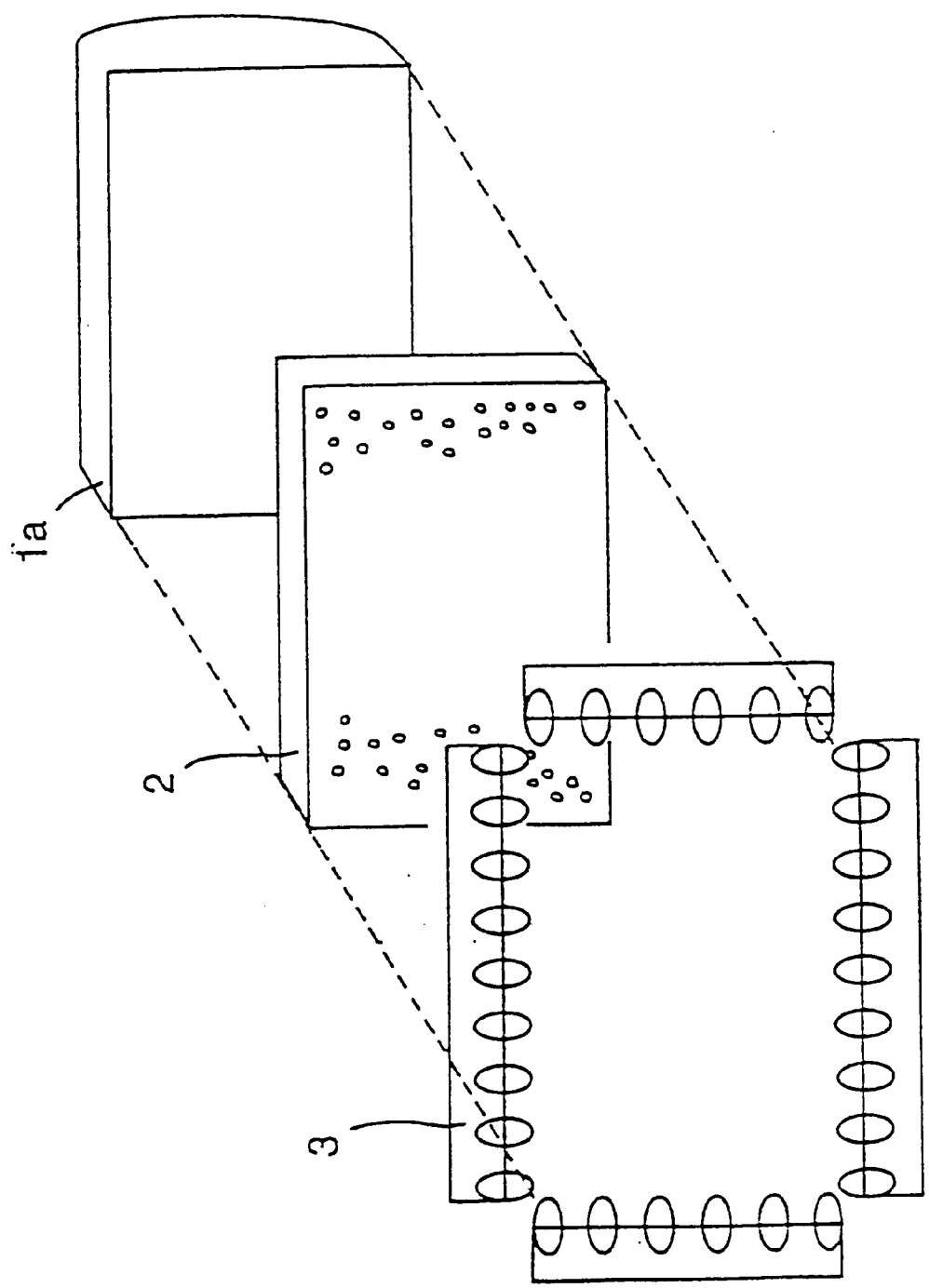
FIG. 2 is a drawing depicting the mounting status of the monitor, tank and sensor of this embodiment.
Figure 3:
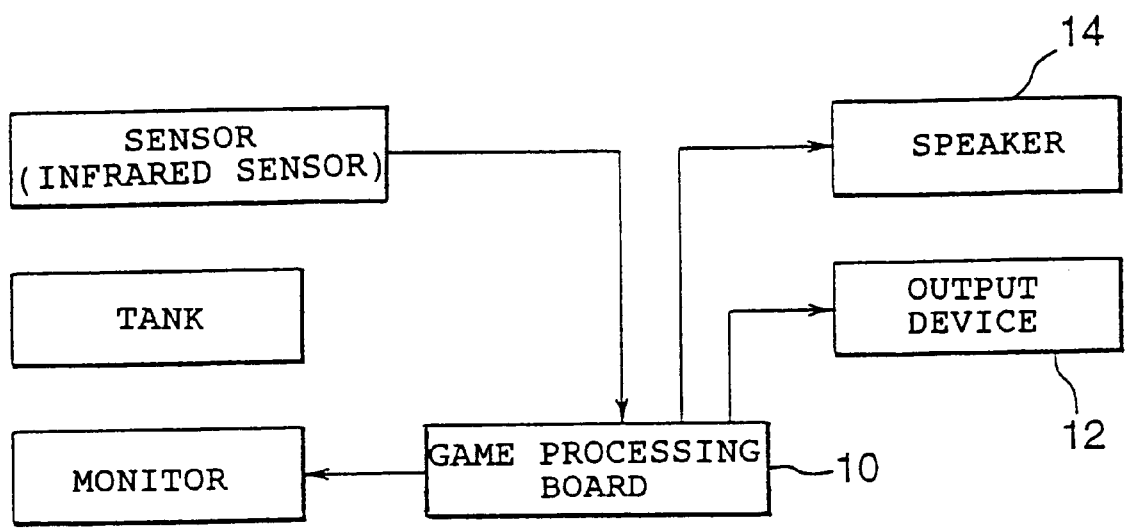
FIG. 3 is a block diagram depicting the relationship between the game processing board and functions.

The sensor 3 is comprised of a matrix sensor where infrared sensors are arranged in a matrix, and is disposed on the front face of the tank 2, as shown in FIG. 2. In other words, the display part of this system has a layered structure of a matrix sensor 3, tank 2 and monitor 1a. If the player lightly taps or touches the tank, the sensor 3 detects this operation and outputs a two-dimensional position signal corresponding to the detected position to the game processing board 10 of the main body 1 (see FIG. 3). The game processing board 10 executes such image processing as polygon (e.g. fish) movement processing, position control of the view point camera, and wave processing in the three-dimensional virtual space based on this position signal, which is described later.

Figure 4:
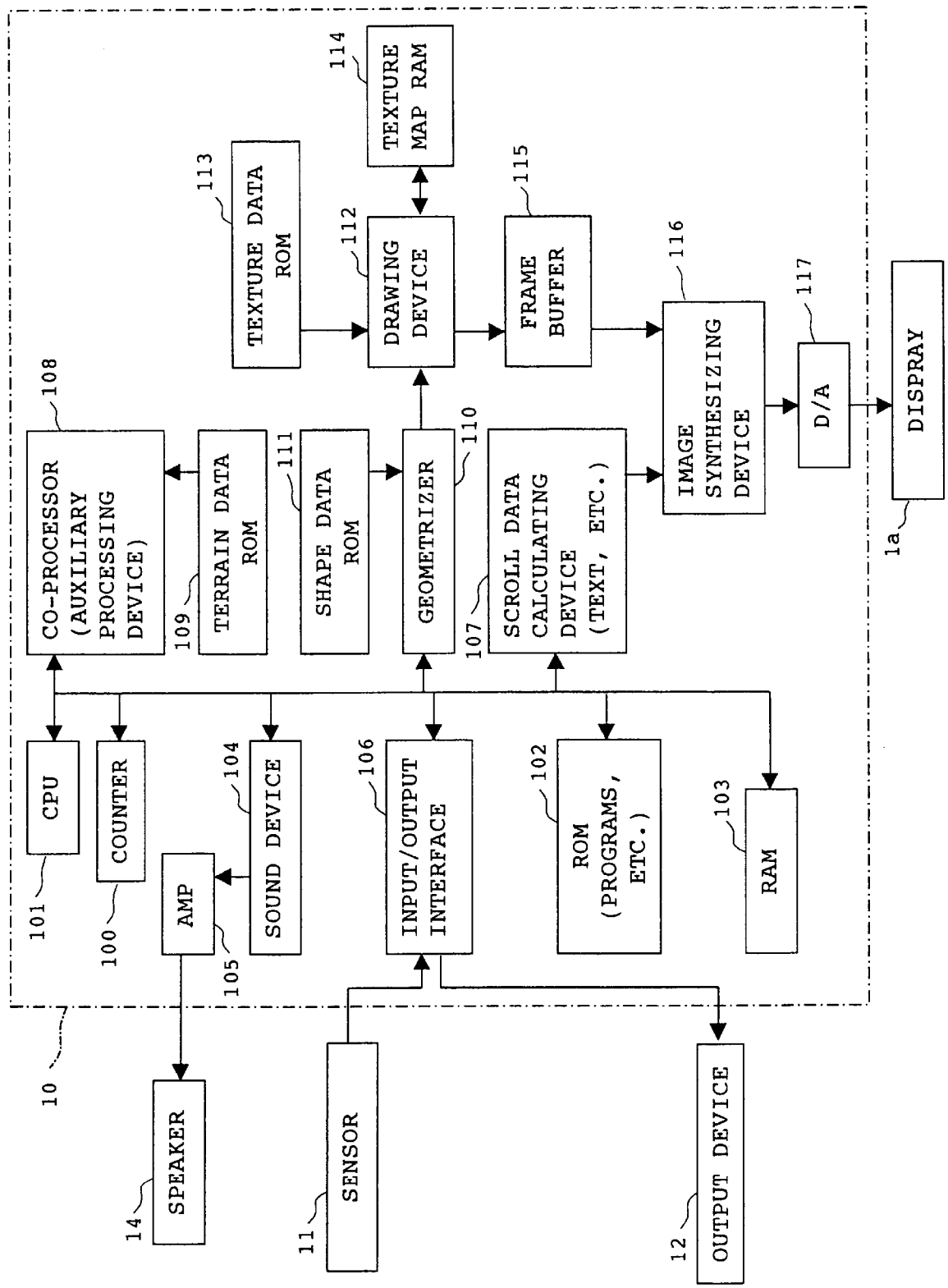
FIG. 4 is an electrical functional block diagram of the game processing board.

The game processing board 10 shown in FIG. 4 is in the main body 1. A monitor (display) 1a, sensor 2, such output devices 12 as a display, and such equipment as a speaker 14 are electrically connected to the game processing board 10. The player can play the enjoyable game by touching the sensor 2 at will while looking at the screen of the tropical fish displayed on the monitor 1a.

As FIG. 4 shows, the game processing board 10 comprises a counter 100, a CPU (Central Processing Unit) 101, ROM 102, RAM 103, sound unit 104, input/output interface 106, scroll data processing unit 107, coprocessor (auxiliary arithmetic processing unit) 108, topographic data ROM 109, geometrizer 110, shape data ROM 111, drawing unit 112, texture data ROM 113, texture map RAM 114, frame buffer 115, image synthesizer 116 and D/A converter 117.

Of these, the CPU 101 is connected to the ROM 102, where predetermined programs and image processing programs are stored, and to the RAM 1 for storing operation data, sound unit 104, input/output interface 106, scroll data processing unit 107, coprocessor 108 and geometrizer 110 via bus lines. The RAM 103 functions as a buffer, and is used for writing various commands (e.g. to display objects) to the geometrizer and for writing of necessary data during various operations.

The input/output interface 106 is connected to the sensor 3. By this, such control signals as position signals from the sensor 3 are digitally input to the CPU 101. The sound unit 104 is connected to the speaker 14 via a power amplifier 105. By this, the power of acoustic signals generated by the sound unit 104 is amplified and output from the speaker 14 as sound.

The CPU 101 reads control signals from the sensor 3, topographic data from the topographic data ROM 109, or shape data (an "object simulating tropical fish", and such three-dimensional data as "background, including topography, sky, rocks, sea floor, and various structures") based on the programs stored in the ROM 102, and executes object behavior calculation (simulation) and other calculations.

The behavior calculation is for simulating movement of an object (tropical fish) in a three-dimensional virtual space (game space). To execute this calculation, the coordinate values of the polygons of the object in the three-dimensional virtual space are determined, then the conversion matrix, to convert these coordinate values to a two-dimensional view field coordinate system and shape data (polygon data), are specified in the geometerizer 110. The topographic data ROM 109 is connected to the coprocessor 108 and the predetermined topological data is transferred to the coprocessor 108 and the CPU 101. The coprocessor 108 primarily executes the calculation of floating points. Since the coprocessor 108 executes various judgments and a judgment result is transferred to the CPU 110, the calculation load on the CPU can be decreased.

The geometrizer 110 is connected to the shape data ROM 111 and the drawing unit 112. The shape data (three-dimensional data on an object comprised of each vertex, topology and background), comprised of a plurality of polygons, has been stored in advance in the shape data ROM 111. This shape data is transferred to the geometrizer 110. The geometrizer 110 executes perspective transformations for the specified shape data using the transformation matrixes sent from the CPU 110, so as to obtain data where the coordinate system in the three-dimensional virtual space has been transformed to a viewing coordinate system.

The drawing unit 112 adds texture to the transformed shape data in the viewing coordinate system, and outputs it to the frame buffer 115. In order to add texture, the drawing unit 112 is connected to the texture data ROM 113 and the texture map RAM 114, and is also connected to the frame buffer 115.

Polygon data refers to the coordinate data group of relative or absolute coordinates of each vertex of polygons (primarily triangles and quadrangles), comprised of a plurality of sets of vertexes. Relatively rough polygon data, which is sufficient for executing a predetermined judgment (e.g. contact judgment) is stored in the topographic data ROM 109. In the shape data ROM 111, on the other hand, more detailed polygon data on shapes, such as objects and background of the screen, is stored.

The scroll data processing unit 107 calculates data, such as characters, on the scroll screen (stored in the ROM 102). This processing unit 107 and the frame buffer 115 are connected to the monitor 1a via the image synthesizer 116 and the D/A converter 117. Because of this, the polygon screen on topography (background) temporarily stored in the frame buffer 115 and the scroll screen on character information are synthesized according to the specified priorities, and a final frame image data is generated at predetermined timing. This frame image data is converted to analog signals by the D/A converter 117, is sent to the monitor 1a, and is displayed as a game screen in real-time.

Figure 5:
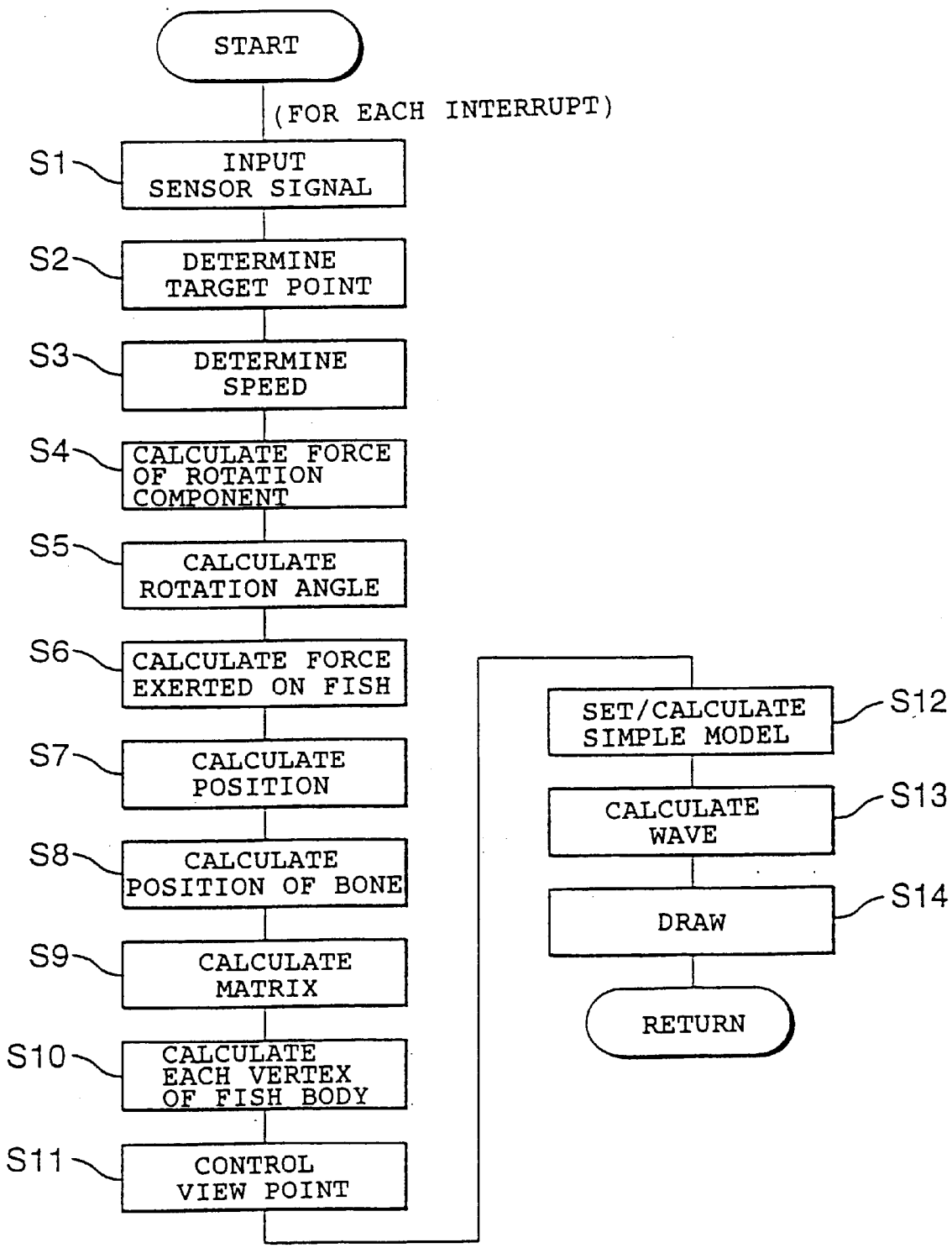
FIG. 5 is a flow chart depicting the main processing routine executed by the CPU.
Figure 6:
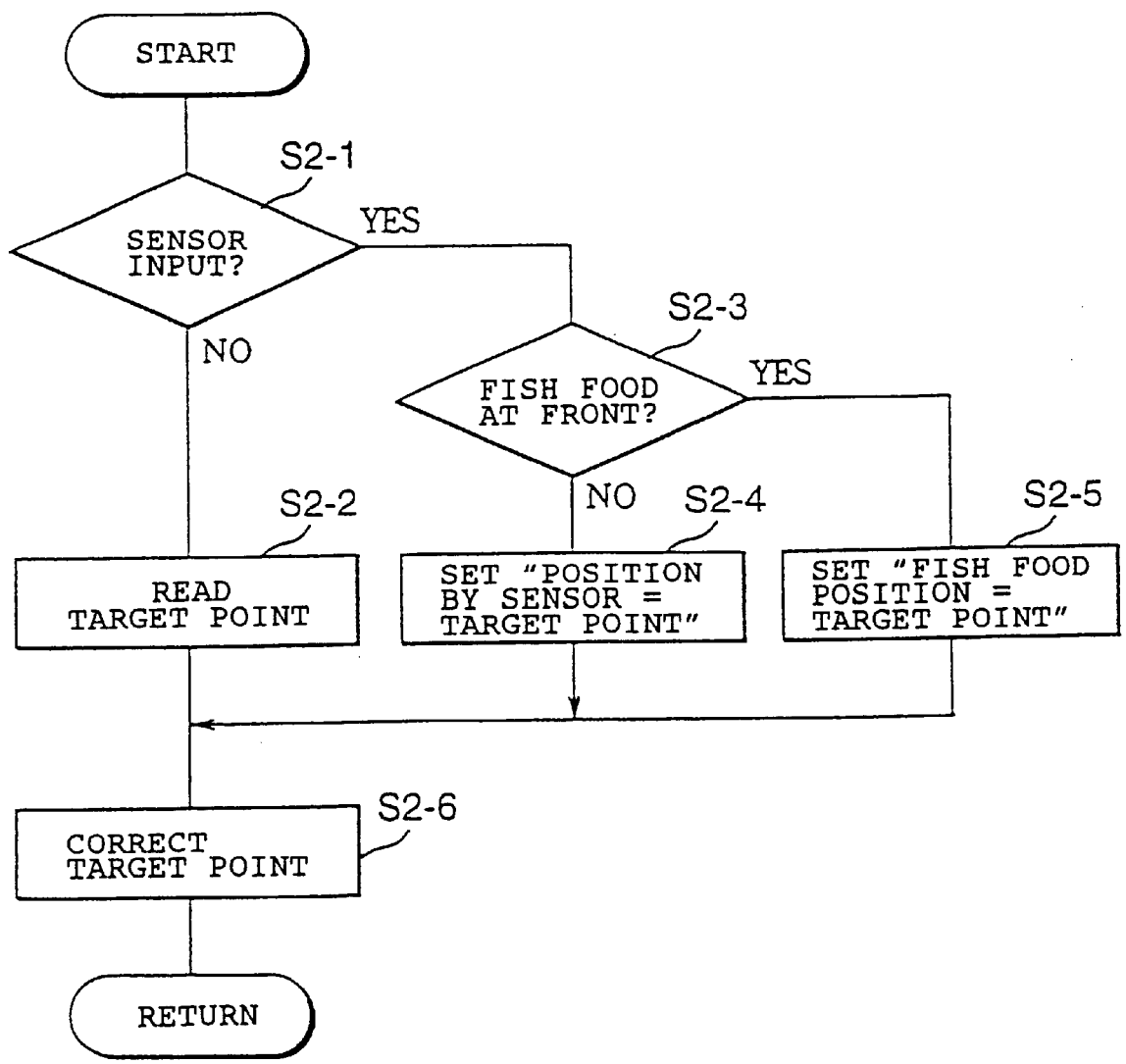
FIG. 6 is a sub-routine for setting a target point executed by the CPU.
Figure 7:
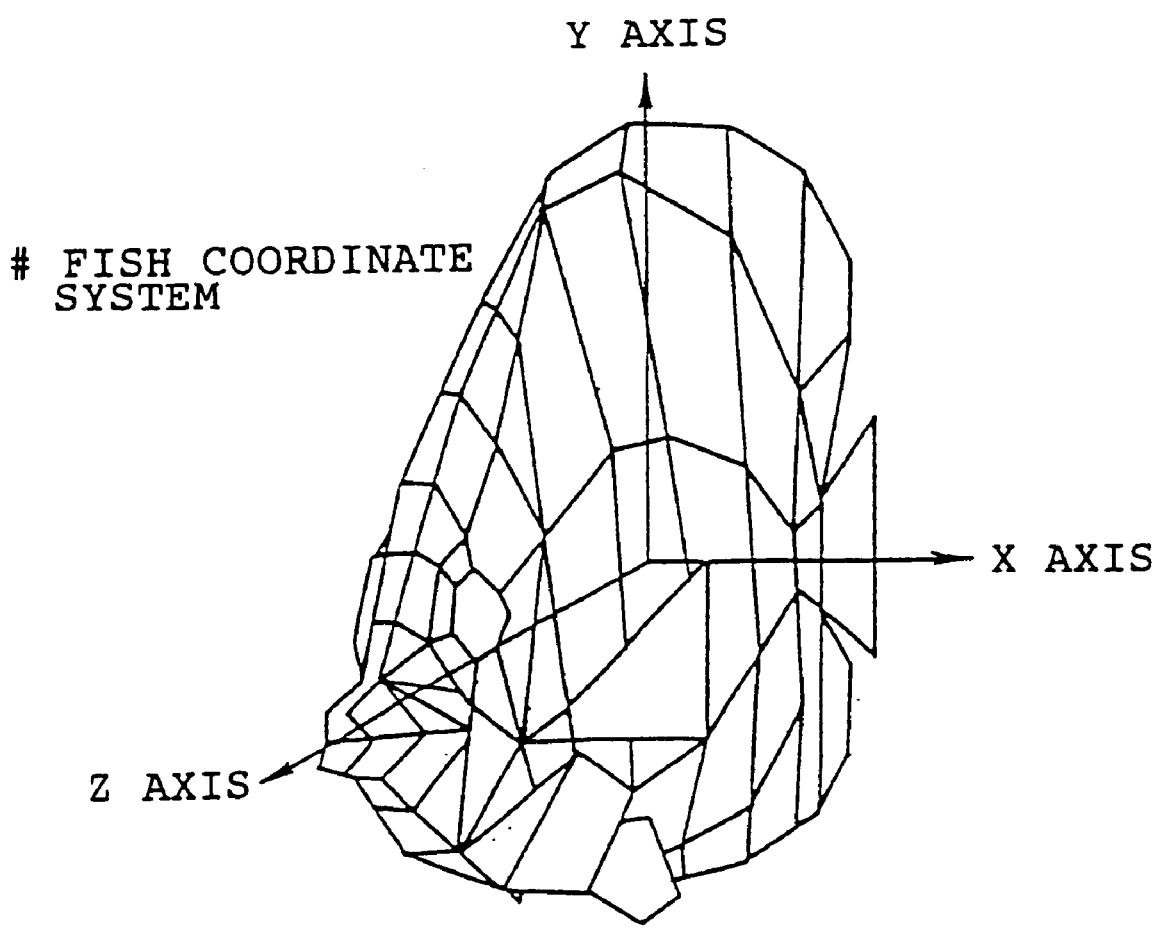
FIG. 7 is a drawing depicting a tropical fish as a mobile object, and shows how to set the coordinate system of the fish.

This image processing system executes the enjoyable game of the tropical fish via the processing units in FIGS. 5 and 6, which includes the CPU 101. FIG. 5 shows the main processing routine which is repeated for each interrupt (e.g. 1/60 seconds), synchronizing the display frame cycle of the monitor 1a, and FIG. 6 shows the detailed sub-routine of the target point determination processing in FIG. 5.

At first, the CPU 101 reads the output signal of the sensors 3 (FIG 5, Step S1), then executes processing for determining the target point of the movement of the fish according to this reading result (Step S2).

The target point determination processing is executed by the CPU 101, as shown in FIG. 6. At first, the CPU 101 judges whether a signal has been output from the sensor 2 (FIG. 6, Step S2-1). If the result of this judgment is NO, that is, if the player did not touch the sensor, then the target point m (m.x, m.y, m.z) of the movement is selected as follows from the discrete table (this may be random numbers) which has been preset (Step S2-2).

$$m.x = \text{table}[\text{timer 1}].x$$

$$m.y = \text{table}[\text{timer 1}].y$$

$$m.z = \text{table}[\text{timer 1}].z$$

Here, the timer 1 is the counter to update the table. x, y and z denote the current coordinate position of the fish (tropical fish). This target point m is updated at each 30–40 interrupts, for example. When a plurality of fish are kept, the target point and the number of interrupts for updating are changed for each fish. This setting of the target point is one characteristic of the present invention, and expresses the natural behavior of fish.

Figure 16:
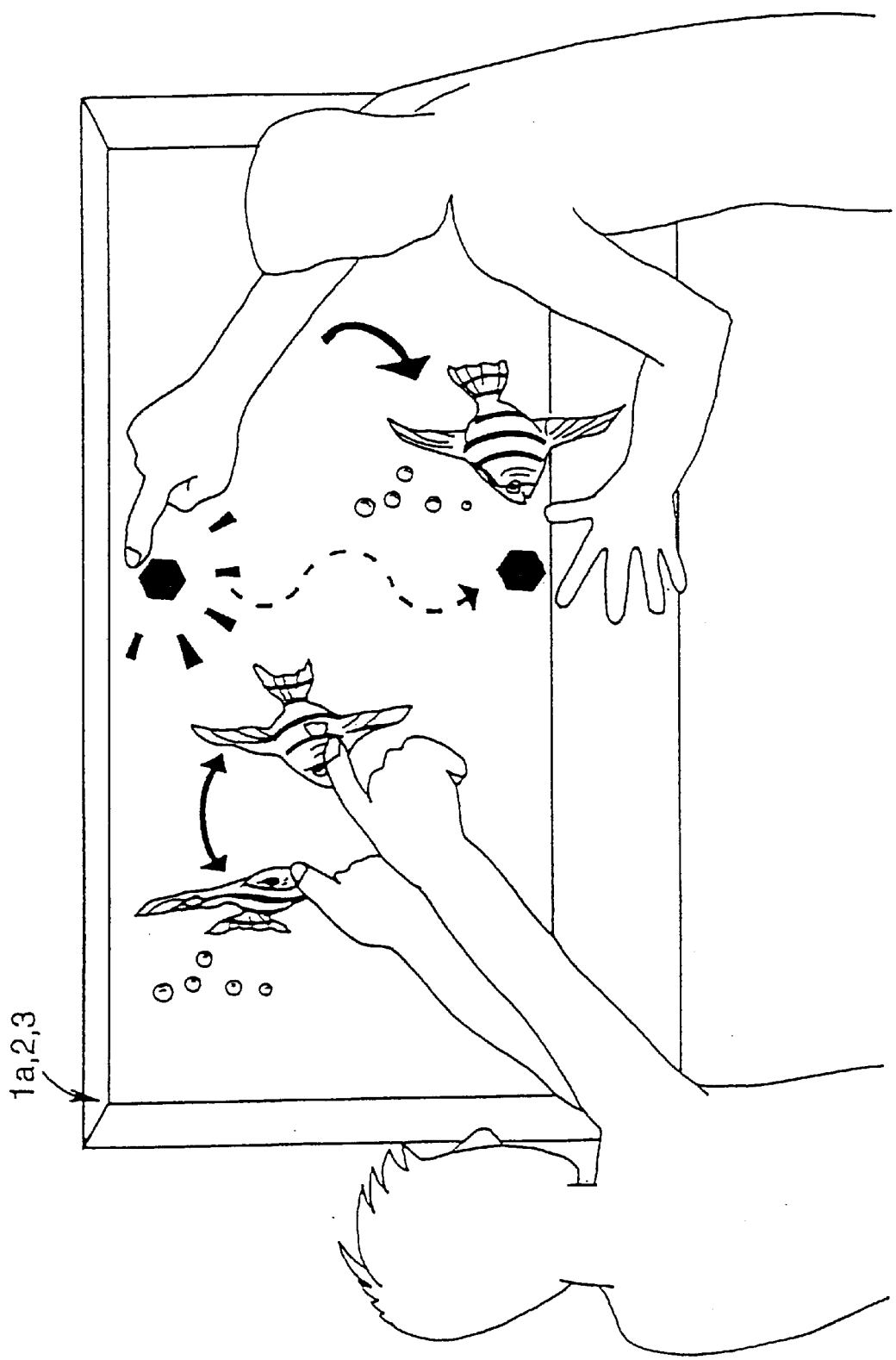
FIG. 16 is a drawing depicting how players touch the sensor (artificial tank)

If the result of the judgment in Step S2-1 is YES, then it is further judged whether the signal received from the player via the sensor 2 indicates a position or fish food in Step S2-3 (see FIG. 16). In this case, the sensor signal when the player touches the sensor 2 is recognized as a signal indicating a position, and the sensor signal when touched by the player two or more times or for a different duration of time is recognized as a signal indicating fish food.

If the judgment in Step 2-3 is NO, that is if it is judged that the signal indicates a position, or that the signal indicates fish food but that the position of fish food is farther than a predetermined value, then the processing advances to Step S2-4, and "the matrix position by the sensor signal=target point" is set. In other words, the following are set.

$m.x = x$ of detected position $m.y = y$ of detected position $m.z = z$ of detected position If the judgment in Step S 2-3 is YES, that is, if it is judged that the signal indicates fish food and the fish food position is directly in front of the fish (within a predetermined range from the fish), then the processing advances to Step S 2-5, and "the matrix position by the sensor signal=fish food position=target point" is set. In other words, the following are set.

$m.x = x$ of fish food position $m.y = y$ of fish food position $m.z = z$ of fish food position After the target point is set in this manner, the target point is further corrected (Step S2-6). This correction processing is executed for (Xmax., Ymax, Zmax), which indicates the maximum value of the spatial position in the virtual tank, which is set in a three-dimensional virtual space, and (Xmin, Ymin, Zmin), which indicates the minimum value of the spatial position in the virtual tank. Specifically, the target point m (m.x, m.y, m.z) which was set is set to:

if $m.x > X\max$ of the tank, then $m.x = X\max$ of the tank if $m.x < X\min$ of the tank, than $m.x = X\min$ of the tank if $m.y > X\max$ of the tank, then $m.y = X\max$ of the tank if $m.y < X\min$ of the tank, then $m.y = X\min$ of the tank if $m.z > X\max$ of the tank, then $m.z = X\max$ of the tank if $m.z < X\min$ of the tank, then $m.z = X\min$ of the tank Because of this, the target point will never deviate from the virtual tank. Then the CPU 101 returns processing back to Step S3 of the main processing shown in FIG. 5. In Step S3, the propelling speed of the fish (speed) is determined referring to the preset value, for example, in the table for each fish type. This propelling speed (speed) may be changed depending on the fish food which appears when the player touches the sensor 3, as mentioned above, or depending on the water temperature. In this way the degree of active movement of fish can be adjusted.

Then in Step S4, the CPU 101 calculates the force Fw (Fw.x, Fw.y, Fw.z) of the rotation component exerted on to the fish. Details are as follows.

At first, the direction vector h (h.x, h.y, h.z), which may be a unit vector, directing from the current position p (p.x, p.y, p.z) to the target point m (m.z, m.y, m.z), is calculated from $h.x = (m.x - p.x)/L$ $h.y = (m.y - p.y)/L$ $h.z = (m.z - p.z)/L$ Here, L denotes a distance between the point p and the point m in each x, y and z direction.

Then the force Fw of the rotation component is calculated. At first, the force Fw.y of the Y axis rotation and the force Fw.x of the X axis rotation of the fish are determined from $Fw.y = (h.z^* \sin(r.y) - h.x^* \cos(r.y))^* speed^* k0$ $Fw.x = (m.y - p.y)^* k1$ Here, k0 and k1 are constants. (r.y) indicates the y coordinate component of the rotation angle r of the fish seen in the global coordinate.

Then, using the timer (timer), the rotation force when the body of the fish oscillates to the left or right when propelling is determined by $Fw.y = Fw.y + (K0 + speed^* k1)$ if the timer 3% 2=0 (remainder when the value of timer 3 divided by 2 is 0) or by $Fw.y = Fw.y - (k0 + speed^* k1)$ if not(the remainder is 1).

Then the rotation force, to prevent fish from contacting the wall of the virtual tank, is determined. For this, it is judged whether the distance from the wall is less than a predetermined value, and is so, Fw.x=Fw.x+x component of rotation force to prevent contacting wall Fw.y=Fw.y+y component of rotation force to prevent contacting wall are calculated. The rotation force to prevent contacting the wall is a value predetermined as a constant.

Then the rotation force to prevent contacting other fish is determined. For this, it is judged whether the distance from other fish is less than a predetermined value, and if so Fw.x=Fw.x+X component of rotation force to prevent contacting other fish Fw.y=Fw.y+Y component of rotation force to prevent contacting other fish are calculated. The rotation force to prevent contacting other fish is also a predetermined value.

The force Fw of the general rotation component is calculated as a synthesis of forces in each condition mentioned above.

The CPU 101 then advances to Step S5, and calculates the rotation angle of the fish. Now, assume that the angular acceleration is aw (aw.x, aw.y, aw.z), the angular speed is w (w.x, w.y, w.z), the rotation angle is r (r.x, r.y, r.z), and the resistance coefficient of water is resist.

Then the influence of the attenuation of the rotation angle speed is calculated by new $w.x$ this time=previous $w.x^* k$ new $w.y$ this time=previous $w.y^* k$ new $w.z$ this time=previous $w.x^* k$ Here k is a constant and is 0<k<1.
The angular acceleration is calculated by $aw.x = (Fw.x - resist^* w.x)^* k$ $aw.y = (Fw.y - resist^* w.y)^* k$ Here k is a constant.
The z rotation angle is calculated by $r.z = (-w.y^* k)$ Here k is a constant.

The angular speed is calculated by $$\text{new } w.x \text{ this time} = \text{previous } w.x + aw.x$$

$$\text{new } w.y \text{ this time} = \text{previous } w.y + aw.y$$

The x and y rotation angles are updated by $$\text{new } r.x \text{ this time} = \text{previous } r.x + w.x$$

$$\text{new } r.y \text{ this time} = \text{previous } r.y + w.y$$

then the CPU 101 calculates the force Fv (Fv.x, Fv.y, Fv.z) exerted on the fish in Step S6.

Specifically the propelling force of the target fish is calculated first.

And the force is calculated based on the judgment on colliding with other fish. If it is judged that a fish will contact another fish, the $$Fv.x = Fv.x + \text{distance to the contact point} * k$$

$$Fv.y = Fv.y + \text{distance to the contact point} * k$$

are calculated. Here K is a constant.

The resultant force Fv exerted on a fish is calculated by synthesizing each force mentioned above.

If it is judged that an external force is also received from the virtual tank in the judgment on collision with the virtual tank, this force is synthesized as Fv. If the fish will contact the tank wall or floor, then $$Fv.x = \text{distance to the contact point} * k$$

$$Fv.y = \text{distance to the contact point} * k$$

are calculated, where k is a constant.

Then the CPU 101 advances to the Step S7 and calculates the position of the fish. Now, assume that the acceleration is av (av.x, av.y, av.z), the speed is v (v.x, v.y, v.z), the position is p (p.x, p.y, p.z) and the resistance coefficient of water is resist.

then the influence of the attenuation of the speed on the propelling of fish is calculated by $$\text{new } v.x \text{ this time} = \text{previous } v.x * k$$

$$\text{new } v.y \text{ this time} = \text{previous } v.y * k$$

$$\text{new } v.z \text{ this time} = \text{previous } v.x * k$$

Here k is a constant and is 0<k<1.

The acceleration is calculated by $$av.x = (Fv.x - \text{resist} * v.x) * k$$

$$av.y = (Fv.y - \text{resist} * v.y) * k$$

$$av.z = (Fv.z - \text{resist} * v.z) * k$$

Here k is a constant.

The speed is updated by $$\text{new } v.x \text{ this time} = \text{previous } v.x + av.x$$

$$\text{new } v.y \text{ this time} = \text{previous } v.y + av.y$$

$$\text{new } v.z \text{ this time} = \text{previous } v.z + av.z$$

The position is updated by $$\text{new } p.x \text{ this time} = \text{previous } p.x + v.x$$

$$\text{new } p.y \text{ this time} = \text{previous } p.y + v.y$$

$$\text{new } p.z \text{ this time} = \text{previous } p.z + v.z$$

Figure 8:
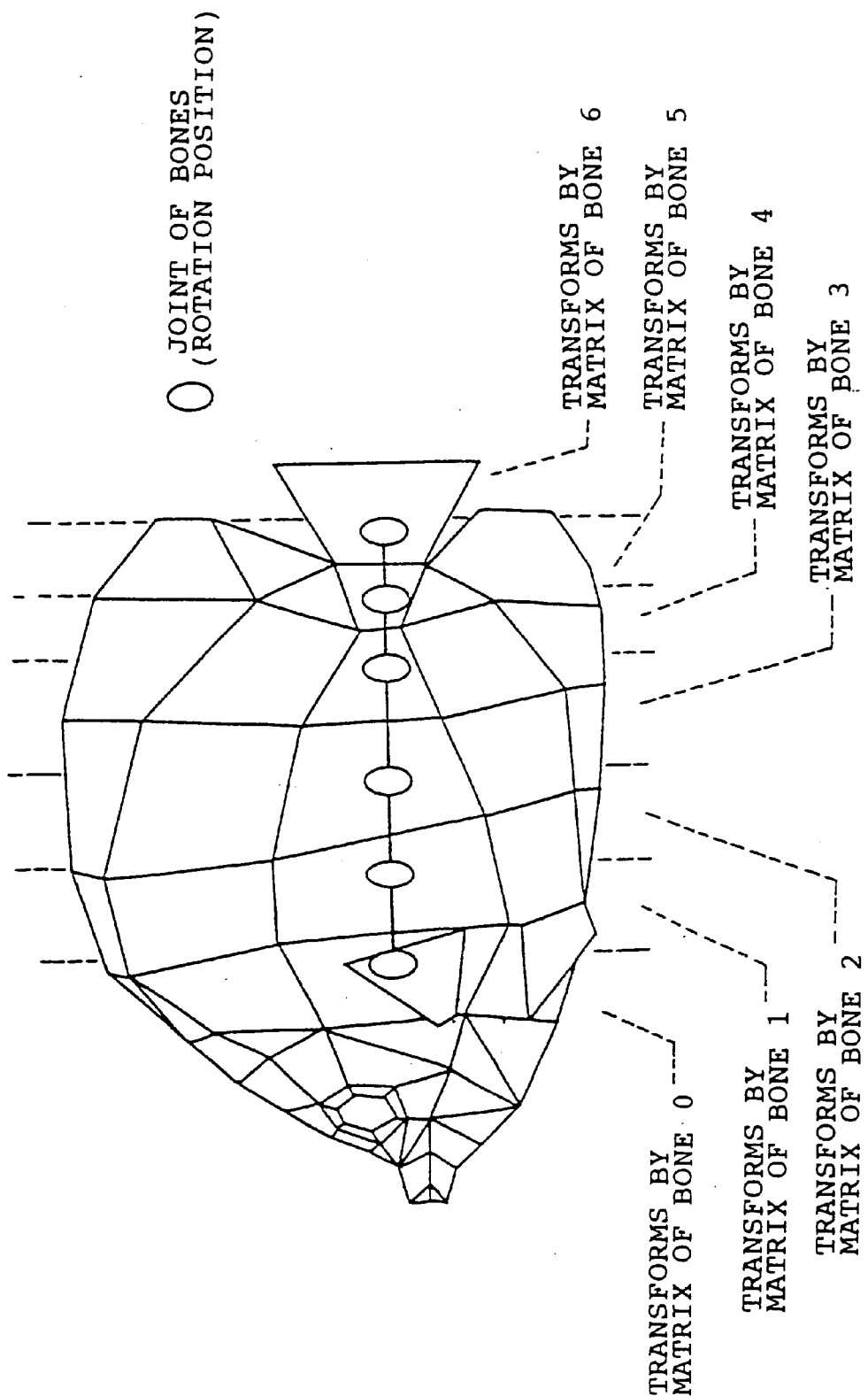
FIG. 8 is a drawing depicting an example of the polygons of the tropical fish as a mobile object and the positions of the virtual bones.

Along with the above mentioned simulation of the movement of fish, the present invention is also wherein the position of virtual bones, which are virtually set for the fish, is controlled. The CPU 101 executes processing for this in the Steps S8–S10. FIG. 8 shows an example of the virtual bones 1–6.

In Step S8, the position p of the fish determined in Step S7 is set as the first bone position closest to the head among the plurality of virtual bones 1–6, and the next bone is sequentially calculated. The conditions to determine the position of a bone at the next joint are:

a. The distance between joints of the bones is constant (bones do not stretch).
  b. The angle at which a bone can bend is limited (bones do not make a turn at a joint).
  c. Bones rotate only along X and Y axes (bones are not twisted).

Since it is preferable to include angular speed, relevant to will of the fish, to the joints which exist behind the center of gravity of the fish, so that simulation close to the actual movement of the fish is executed, this angular speed, which is relevant to the will of the fish, is added to rotation for the body near the tail. The bone for which angular speed, which is relevant to the will of the fish, is predetermined depending on the fish.

Specifically, the following processing is repeated for the number of joints of the bones.

Assume that the updated position of the joint of the bone is $$p0 = bone[i-1].p$$

and that the position of the joint of the bone to be updated is $$p1 = bone[i].p$$

and determine the direction vector by $$v.x = (p1.x - p0.x)/L$$

$$v.y = (p1.y - p0.y)/L$$

$$v.z = (p1.z - p0.z)/L$$

Here L is a distance between the point p0 and the point p1 in each axis direction.

The angle ang Y along the Y axis formed by the v.x vector and v.z vector is determined as follows. If the joint is behind the center of gravity of the fish, then set to ang Y=ang Y+(angular speed to be the will of fish).

If the angle formed by ang Y=joint of the bone[i−1] >upper limit angle of the bone, then set to bone [i].r.y(angle formed by joint i of the bone)=upper limit angle of the bone, if the angle formed by ang Y−joint of the bone[i−1]<lower limit angle of the bone, then set to bone[i].r.y(angle formed by the joint i)=lower limit angle of the bone, otherwise, set to $$bone[i].r.y(\text{angle formed by the joint } i \text{ of the bone}) = ang\ Y$$

In the same way, ang X along the X axis is determined.

Using the determined angle ang Y. and ang X, the direction vector bone[i].v from the joint of the bone i−1 to the joint of the bone i is determined. The new position of a new joint of the bone i, which is bone [i].p, is determined as follows using the position of the previous (forward) joint of the bone i−1, which is bone [i−1].p and the direction vector bone [i].v directing from the joint i−1 to the joint i.

bone[i].p.x=bone[i−1].p.x+bone[i].v.x*distance between joint i and the joint i−1 bone[i].p.y=bone[i−1].p.y+bone[i].v.y*distance between joint i and joint i−1, bone[i].p.z=bone[i−1].p.z+bonei.v.z*distance between joint i and joint i−1

The above processing is repeated for the number of joints of the bones, and the respective positions of the virtual bones are calculated.

Figure 9:
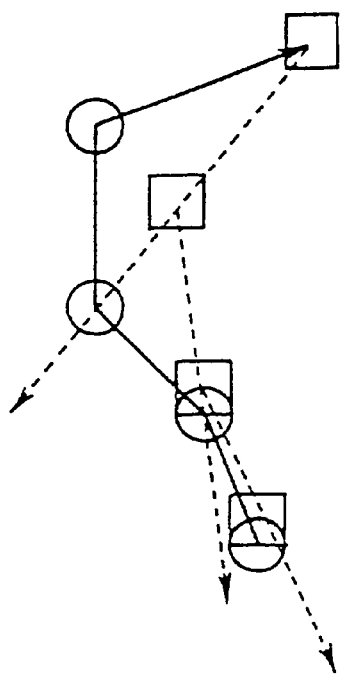
FIG. 9 is a drawing depicting an example of controlling the positions of the virtual bones.
Figure 9:
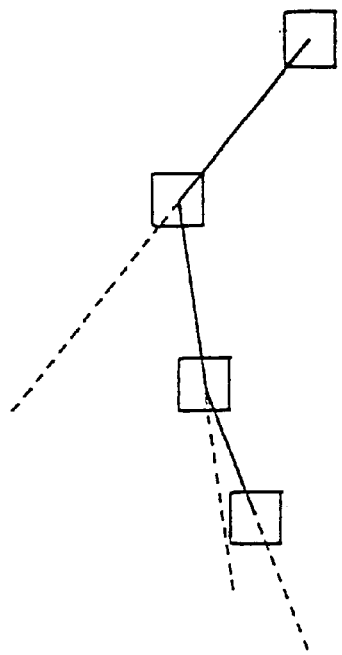

Then the CPU 101 determines the matrix transformation of (Y rotation, X rotation) to calculate the respective positions of the vertical bones in Steps S9 and S10, and each vertex position of the fish body according to the bones is calculated (see FIG. 8). FIG. 9 (a) and (b) show an example of the position control of the virtual bones.

Then the CPU 101 sets the view point of a virtual camera, focusing on the fish and fish food, which the player is paying attention to. Because of this, the screen displayed on the monitor 1a via the later mentioned drawing processing is the view from the camera view point which is set here.

Then the CPU 101 executes processing in Steps S12–S13. These processings, which are for promoting the atmosphere of the fish in water, express a fish floating in waves using a simple model of waves, and creates light waves projected in the water using the rotation and position data of the simple model.

Figure 10:
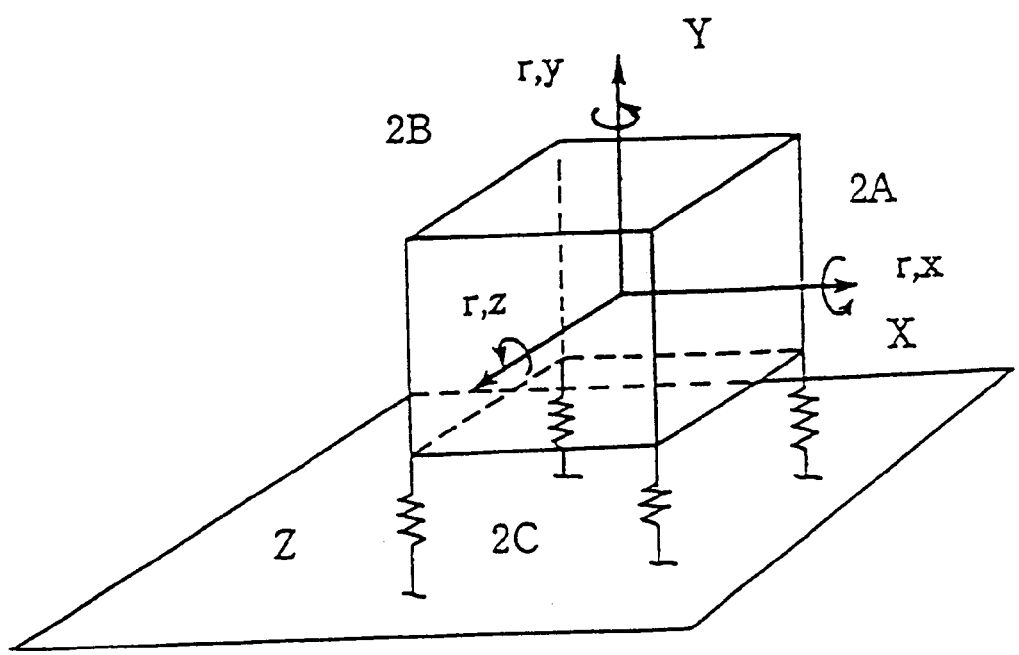
FIG. 10 is a drawing depicting a simple model of waves.

At first in Step S12, a simple model for a small wave is set, and the physical constant related to this model is calculated. Specifically, the simple model which is preset and stored, as shown in FIG. 10, is read. This simple model has a rectangular parallelepiped shape, where sides are 2A, 2B and 2C, and a mass is M, and four corners of the base are supported by springs. Here the spring constants in the vertical direction and horizontal direction of each spring are k1 and k2 respectively. The position of the center of gravity is the origin, and moment of inertia is I1, I2 and I3. The acceleration vector is av (x, y, z), speed vector is v (x, y, z), speed vector is u (x, y, z), position is p (x, y, z), angular acceleration is aw (x, y, z), angular speed is w (x, y, z), and the angle is r (x, y, z).

By changing the initial conditions of this simple model or by changing the spring constants for each interrupt, the movement of an object floating on a large or small wave can be freely expressed. In other words, the equations for motion established for this simple model are $M*av.x+4*k2*p.x=0$ $M*av.y+4*k2*p.y=0$ $M*av.z+4*k1*p.z=0$ $I1*aw.x+4*(k1*B*B+k2*C*C)*r.x=0$ $I2*aw.y+4*(k1*A*A+k2*C*C)*r.y=0$ $I3*aw.z+4*k2*(A*A+C*C)*r.z=0$ $I1=M*(B*B+C*C)/3$ $I2=M*(C*C+A*A)/3$ $I3=M*(A*A+B*B)/3$ These equations determine the position p (x, y, z) and angle r (x, y, z) for each interrupt.

If the spring constants k1 and k2 are set to arbitrary values, for example, the acceleration can be calculated by $av.x=-4.0*k2*p.x/M$ $av.y=-4.0*k2*p.y/M$ $av.z=-4.0*k1*p.z/M$ and the angular acceleration can be calculated by $aw.x=-4.0*(k1*B*B+k2*C*C)*r.x/I1$ $aw.y=-4.0*(k1*A*A+k2*C*C)*r.y/I2$ $aw.z=-4.0*k2*(A*A+B*B)*r.z/I3$ The speed can be calculated by new v.x this time=previous v.x+av.x new v.y this time=previous v.y+av.y new v.z this time=previous v.x+av.z The angular speed can be calculated by new w.x this time=previous w.x+aw.x new w.y this time=previous w.y+aw.y new w.z this time=previous w.z+aw.z Therefore the positions can be determined by new p.x this time=previous p.x+v.x new p.y this time=previous p.y+v.y new p.z this time=previous p.z+v.z And the rotation angle is determined by new r.x this time=previous r.x+w.x new r.y this time=previous r.y+w.y new r.z this time=previous r.z+w.z Moving waves can be expressed by reflecting the position p (x, y, z) and the rotation angle r (x, y, z) to the fish body, wave surfaces and background In Step S13, data to express the light waves is created. In this embodiment, the model where light wave texture is projected on the polygon model is drawn on the ordinary polygon model of a fish to express the waves projected on the fish. By doing this hardware-based environment mapping is unnecessary.

Figure 11:
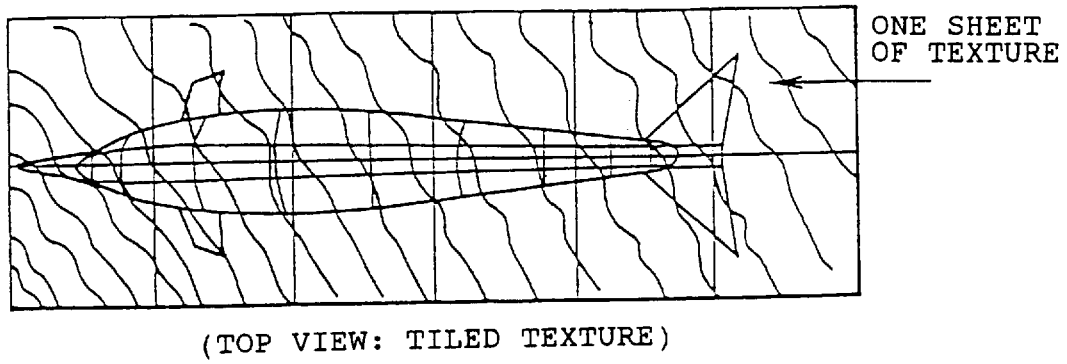
FIG. 11 is a drawing depicting the projection of light waves.
Figure 12:
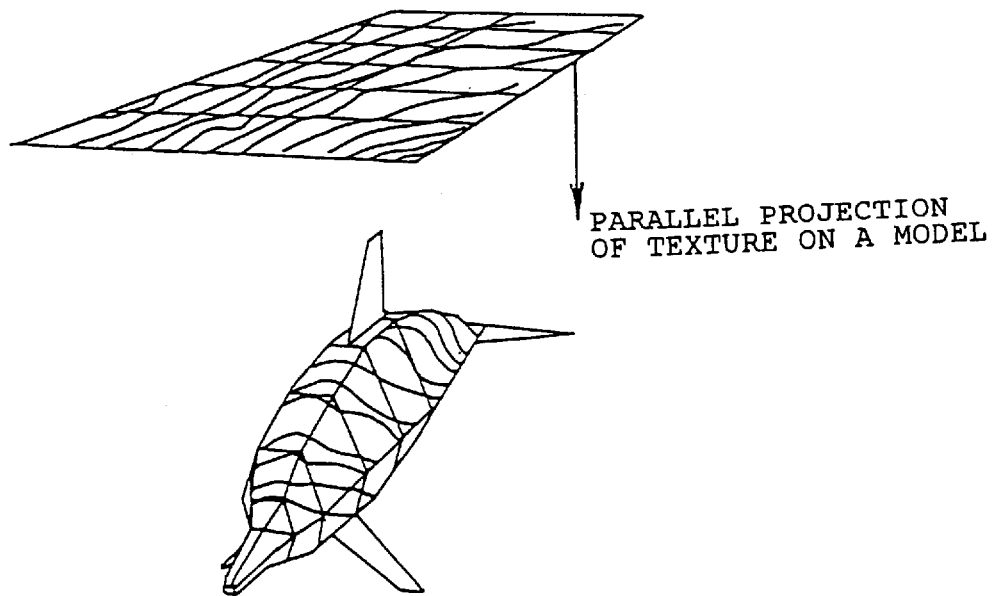
FIG. 12 is a drawing depicting the projection of light waves.

The light wave texture is always projected on the fish in global coordinate by X-Z plane projection, as shown in FIGS. 11 and 12. (Actually a fish is in a state close to this X-Z plane projection since in the ocean it receives light from the top.) Since the position and rotation status of the fish changes in real-time, texture projection processing is executed in real-time.

Figure 13:
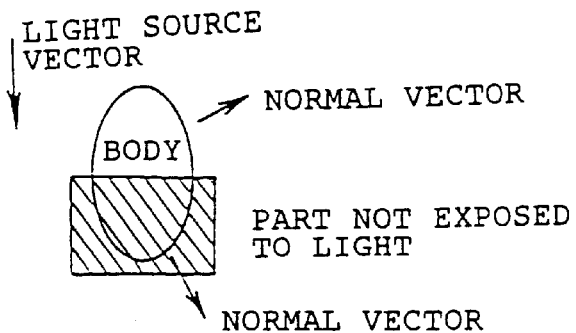
FIG. 13 is a drawing depicting the judgment of position where light is projected based on the light source vector and normal vector.
Figure 14:
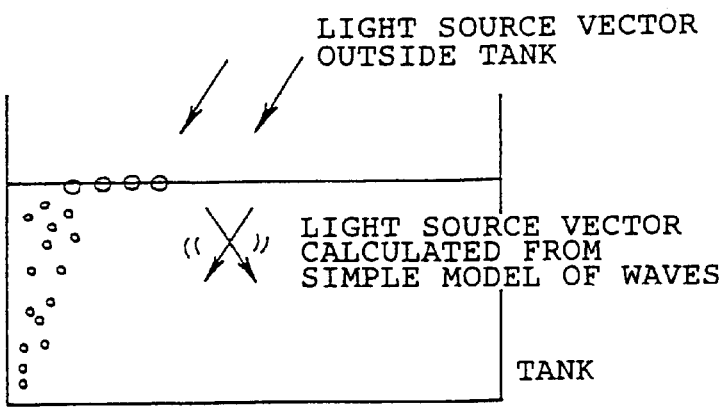
FIG. 14 is a drawing depicting a light source vector in water calculated using the simple model of waves.
Figure 15:
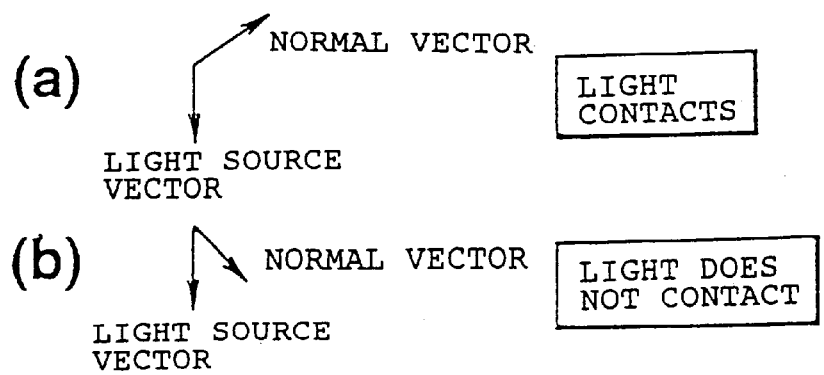
FIG. 15 is a drawing depicting the judgment of position where light is projected based on the light source vector and normal vector.

To express the brightness of the light reflected on the fish, the transparency of each polygon of the fish with parallel-projected texture is changed according to how light contacts the fish. For example, light is brighter when a fish is closer to the sea surface, and areas where light does not contact are set to be transparent polygons, as shown in FIG. 13. To execute this processing, a light source vector is irradiated from the outside to the virtual tank at a predetermined angle, and this light source vector is calculated from the simple model of waves. In this way, the light source vector precesses when the light source vector enters the virtual tank (see FIG. 14). If the angle formed by the light source vector and normal vector of the polygon is an acute angle, as shown in FIG. 15 (b), the polygon is set to be a transparent polygon, judging that light does not contact the polygon. If the angle is an obtuse angle, on the other hand, as shown in FIG. 15 (a), transparency is set to be higher as the angle becomes smaller, since brightness increases as the angle increases.

In quantitative terms, if the 4 column×4 row matrix of the model (fish) is mat00 mat01 mat02 mat03
mat10 mat11 mat12 mat13
mat20 mat21 mat22 mat23
mat30 mat31 mat32 mat33 then the texture pointer (U, V) of the vertex (x, y, z) of the polygon is $$U=x*mat00+y*mat01+z*mat02+mat30$$

$$V=x*mat20+y*mat21+z*mat22+mat32$$

The transparency T of the polygon is calculated by the inner product of the light source vector light and normal vector n of the polygon (both light and n vectors are unit vectors) as $$T=(light.x*n.x+light.y*n.y+light.z*n.z)*32$$

when 32 levels of the transparency of the polygon can be selected. When the angle is an acute angle, T=0 is set since light does not contact.

The polygon is drawn with this texture pointer (U, V) and the polygon transparency T.

The various calculation information obtained in this way is transferred to the geometrizer 110 and the scroll data processing unit 107 in Step S14, where drawing processing for each interrupt is instructed.

By this, a fish moving in real-time can be expressed on the screen of the monitor 1a. Unlike a conventional type movement, the movement of this fish is controlled using a target point, and the target point is updated for each predetermined number of interrupts or is updated according to the touch of the player on the sensor. In this method for setting the target point, processing for expressing the behavior of such living creatures as a tropical fish is relatively easy, the processing volume is small, and creature movement looks more natural than the method for interpolating previously created data on movement (movement data, matrix data on rotation/enlargement or shrinkage).

Since this setting of the target point makes the behavior of the fish more real than the conventional method, moving the fish more naturally, the player can enjoy fish in a three-dimensional virtual space as if real fish existed, and can enjoy a very realistic enjoyable game.

Also the player can signal a fish or feed a fish by tapping or touching the sensor, as shown in FIG. 16, with the fish responding by swimming away or approaching based on instructions from the player. As a result, the player can enjoy an enjoyable game while interactively communicating with fish in a tank in a three-dimensional virtual space, just like an actual tank.

Images can be displayed with a camera view point, focusing on fish or fish food which the player is paying attention to. This means that a feeling of virtual reality, slightly different from an actual tank, can be created, and an enjoyable game offering considerable amusement can be provided.

In the above embodiments, fish floating on wavy water is expressed, but these waves may be "ocean waves". To implement this, the texture of two layers of polygons are moved (positions of the polygons are unchanged). The texture used here is semi-transparent with one tiling possible. The vertical motions of the waves are expressed by moving the vertex p (x, y, z) of the polygon by the sine function, such as $$p.y=\sin(Timer*(p.x+p.z))$$

The texture pointer (U, V) of the vertex (x, y, z) of the polygon is set to

*new U this time=previous U+TX*

Figure 17:
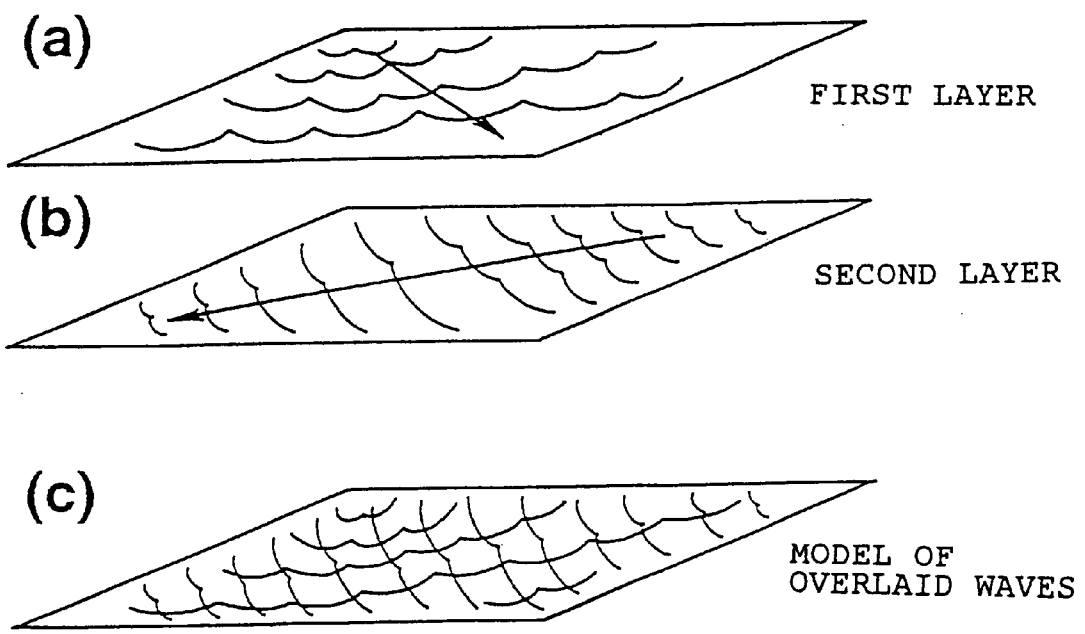
FIG. 17 is a drawing depicting another example of expressing waves (ocean waves)

*new V this time=previous V+TZ* for the first layer, as shown in FIG. 17. Here TX and TZ are constant. For the second layer

*new U this time=previous U+TX*

*new V this time=previous V+TZ* are set. The polygon is drawn with the texture pointer (U, V). In this way, ocean waves can be expressed, as shown in FIG. 17 (c), by overlaying the texture of two layers of polygons.

A living creature to be the subject of this enjoyable game is not limited to the above mentioned tropical fish (fish), but may be such creatures as a bird or insect.

The target point can be set not only to a point around the virtual tank, as in the above mentioned embodiment, but to another fish which is different from the control target fish, or to a point, an area, or a range in a space outside the virtual tank.

The target point can be moved according to the movement of the fish at an appropriate timing, period or time, whether the fish reaches the target point or not, and it is also possible to set a new target point. Because of this, the movement of various objects (fish) can be freely simulated using a small volume of data.

Now another embodiment for the above mentioned fish bone position control will be described.

For the above mentioned fish bone position control, the following was defined or used as preconditions.

a. The distance between joints of the bones is constant (bones do not stretch).

b. The angle at which a bone can bend is limited (bones do not make a turn at a joint).

c. Bones rotate only along X and Y axes (bones are not twisted).

If the position of a joint of a bone in one previous frame is denoted by ○ and a new position of the joint of the bone after the position is changed is denoted by □, the updated position of the joint of the bone is Pn−1 (Pn−1 of □), and the position of the joint of the bone to be updated from now on is (Pn of ○), then the direction vectors connecting the adjacent two joints are as follows.

$$Vn.x=Pnx.-Pn-1.x$$

$$Vn.y=Pn.y-Pn-1.y$$

$$Vn.z=Pn.z-Pn-1.z$$

Figure 18:
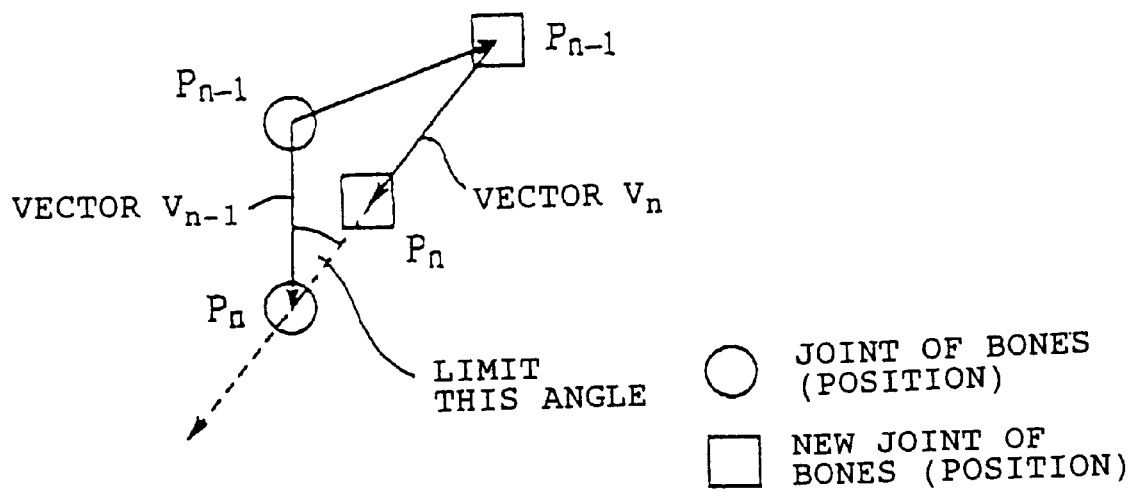
FIG. 18 to FIG. 20 are drawings depicting the operation of other embodiments on the control of the joint positions of the virtual bones.

Here, the angle formed by the Vn vector and Vn−1 vector is determined. This angle is restricted, as shown in FIG. 18, to correct the $V_n$ vector, and the new position Pn of the joint of the bone (Pn of □) is determined.

In a variant form of the embodiment to be described here, on the other hand, the movement of the fish can be reproduced without calculating the angle as above. In other words, "b. The angle at which a bone can bend is limited (bones do not make a turn at a joint)" is changed to "Vn vector is pulled at a predetermined force in the direction to straighten the fish (vector f)". Because of this change, the modified embodiment has the advantage in that the calculation time for determining the angle can be omitted. One reason why calculation time can be omitted is because the calculation for the arc tangent is unnecessary.

The modified embodiment also has the advantage in that the movement of the fish is smoother compared to the above mentioned case where the angle is limited. If the angle is limited, the movement of the fish at the limit of the angle becomes rigid, and the behavior of the fish becomes more unnatural compared with the behavior of a real fish. Since this embodiment does not set a limitation on the angle, the swimming behavior of the fish does not become unnatural.

Figure 19:
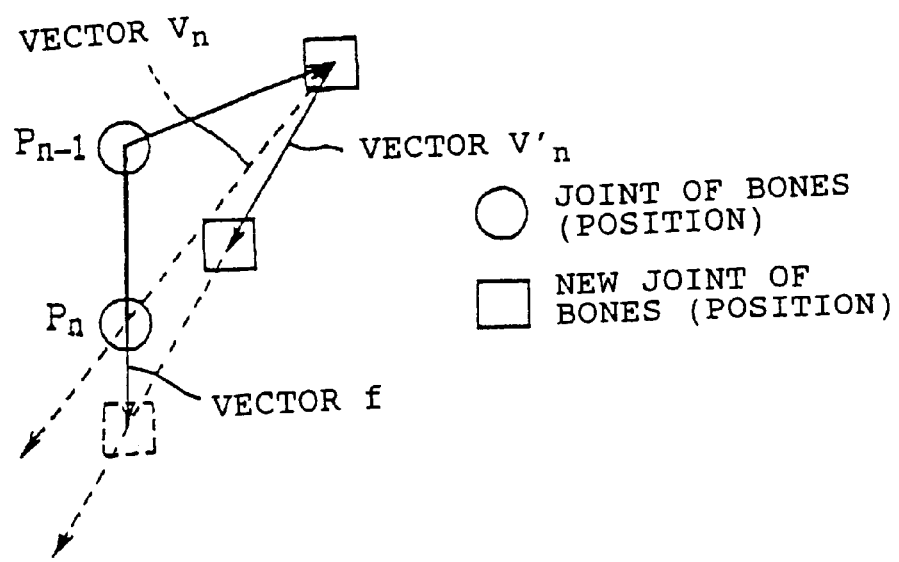

FIG. 19 shows the joint position control for fish according to this modified embodiment. In FIG. 19, the $V_n$ vector in FIG. 18 is changed to the V'n vector. This vector is changed as follows.

The direction of the $V'_n$ vector is a direction where the Vn vector and the vector f are added.

$V'n.x=Pn.x-Pn-1.x+f.x$ $V'n.y=Pn.y-Pn-1.y+f.y$ $V'n.z=Pn.z-Pn-1.z+f.z$

By appropriately changing the size of the vector f, the flexibility of the fish body can be changed.

The position of the joint of the bone of the fish is determined as follows as described for the previous embodiment.

$Pn.x=Pn-1.x+U.x*$(distance between joint n and joint n−1)

$Pn.y=Pn-1.y+U.y*$(distance between joint n and joint n−1)

$Pn.z=Pn-1.z+U.z*$(distance between joint n and joint n−1)

The vector U here is the unit vector of the vector V'n.

Figure 20:
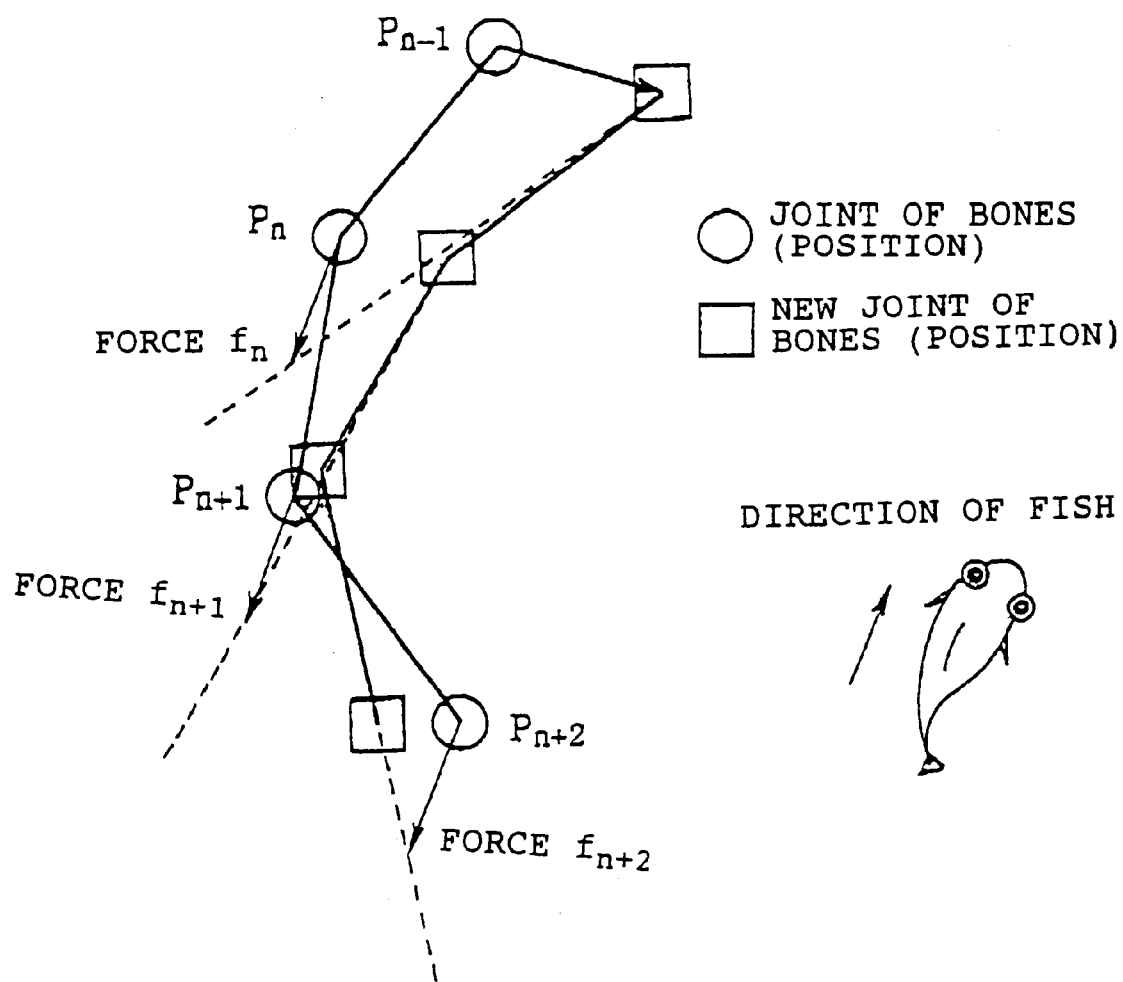

FIG. 20 is a more advanced example than FIG. 19, where the number of joints is increased to 4. The vector f has a direction directing from the first joint Pn−1 (head of the fish) in the joint positions of the previous frame (shown by ○) to the center of the gravity of the fish. In this embodiment, the center of the fish, that is, the point between the joint Pn and the joint Pn+1, is determined to be the center of gravity. Calculation of the new position of the joint of the bone can be sequentially executed for the continuous joints using the method described in FIG. 18. The vectors f, f+1 and f+2 for different joints can be changed respectively. By changing the size of the vector f depending on the position from Pn+2, which is a joint at the tail, particularly by setting the value sequentially to be smaller values as the area becomes closer to the tail, a more flexible behavior of the fish can be implemented. The inventor of the present invention believes that this behavior is closer to the behavior of fish in the natural world. As the size of the vector f becomes smaller, the position of the joint in the previous frame (status before change) is reflected, that is, the status of the previous frame is maintained, so the position of the joint does not greatly change and the behavior of the fish becomes more gentle.

In the previous embodiment and in this embodiment, fish was used as an example for explanation, but the present invention is not restricted by this. Objects, other than fish, which behave as if joints exist, include insects and reptiles. Other objects whose behavior can be controlled with virtual joints are long string type objects, the movement of hair and the movement of cloth. An object which moves by "snaking" is also included in this category.

According to this embodiment, the behavior of these objects can be displayed as more real by providing a plurality of joints, and by calculating the positions of adjacent joints sequentially in real-time.

INDUSTRIAL APPLICABILITY

As explained above, according to the image processing system and the image processing method in accordance with the present invention, the movement of a mobile object is simulated based on the target point of the movement of the mobile object so as to calculate image data and this image data is displayed, therefore the movement of a living creature, such as fish in a three-dimensional virtual space can be expressed as more real and natural, and a very realistic enjoyable game, which allows enjoying living creates as if they were real creatures, can be provided. It is also possible to express interaction between the mobile object and the player by simulating such living creatures as a fish in a three-dimensional virtual space, therefore a realistic feeling can be enhanced and an enjoyable game offering amusement can be provided.

The above mentioned ROM 102 corresponds to a storage medium where programs for the game machine to implement the above explained image processing operations are stored. ROM includes CD-ROM and cassette ROM. A floppy disk, hard disk or communication medium may also be used. Also a RAN server may be included here.

What is claimed is:

1. An image processing unit for generating image simulating moving states of a mobile object by moving said mobile object in a three-dimensional virtual space, comprising:
   mobile object movement calculation means for calculating image data for expressing the movement of said mobile object with reference to a target point of the movement of said mobile object;
   display control means for controlling a display of the image data of said mobile object calculated by said mobile object movement calculation means; and
   target point setting means for setting the target point of the movement of said mobile object, wherein said target point setting means sets the target point of the movement of said mobile object by selecting a value for position in said three-dimensional virtual space from among discrete values for positions in said virtual space.

2. The image processing unit according to claim 1, wherein said target point setting means has a table where discrete values on positions in said three-dimensional virtual space are set in advance, and sets the target point of the movement of said mobile object by selecting a discrete value from the table.

3. An image processing system comprising the image processing unit according to claim 1, a display unit for displaying images generated by said image processing unit, and a sensor which is disposed on the front face of said display unit and detects instruction information from the player to said mobile object, wherein said image processing unit has instruction information input judgment means for judging whether said instruction information has been input, and when said instruction information input judgment means judges that instruction information has been input, said target point setting means sets the target point of the movement of said mobile object according to the instruction information detected by said sensor.

4. The image processing system according to claim 3, wherein the tank is provided between the front face of said display unit and said sensor.

5. The image processing system according to claim 3, wherein said sensor is a matrix sensor where infrared sensors which the player can touch to input information are arranged in a matrix.

6. The image processing system according to claim 3, wherein said mobile object moves to a position corresponding to the instruction information input by said player.

7. The image processing unit according to claim 1, wherein said three-dimensional virtual space includes a virtual tank and said mobile object simulates a living creature which moves in said virtual tank.

8. The image processing unit according to claim 7, wherein said mobile object movement calculation means further comprises: creature's virtual bone setting means for setting a plurality of virtual bones for said mobile object; creature's position calculation means for calculating the position of said mobile object in said three-dimensional virtual space according to said target point set by said target point setting means; virtual bone position calculation means for sequentially calculating the positions of the plurality of virtual bones set for said mobile object using said position; vertex position calculation means for calculating the respective vertex positions of the polygons using the positions of said virtual bones; and image data generation means for generating image data of said mobile object according to said respective vertexes.

9. The image processing unit according to claim 8, wherein said movement calculation means further comprises: atmosphere information calculation means for calculating atmosphere information which influences the images of the mobile object in said three-dimensional virtual space; and information generation means for generating information to add said atmosphere information to the image data of said mobile object.

10. The image processing unit according to claim 9, wherein said atmosphere information indicates waves of water in said virtual tank.

11. The image processing unit according to claim 9, wherein said atmosphere information indicates light waves moving in water in said virtual tank.

12. The image processing unit according to claim 11, wherein said virtual tank has a simple model of the waves, this simplified model is a virtual model of a rectangular parallelepiped where three sides are predetermined values, weight is a predetermined value, and each one of the four corners of the base is supported by a spring respectively, and said atmosphere information calculation means calculates said atmosphere information where the movement of waves is simulated by changing the spring constants of said springs at each predetermine time.

13. The image processing unit according to claim 7, wherein said target point setting means has target point correction means for correcting the set value of the target point according to the size of said virtual tank.

14. The image processing unit according to claim 1, wherein said target point setting means updates the target point of the movement of said mobile object by reselecting said discrete value at each predetermined time.

15. The image processing unit according to claim 1, wherein said mobile object movement calculation means has creature's virtual joint setting means for setting a plurality of virtual joints for said mobile object, so as to calculate the positions of said plurality of virtual joints and calculates image data for expressing the movement of said mobile object according to the positions of the virtual joints.

16. The image processing unit according to claim 15, wherein said target point setting means has a table where discrete values on positions in said three-dimensional virtual space have been set in advance and sets the target point of the movement of said mobile object by selecting a discrete value from the table.

17. An image processing system comprising the image processing unit according to claim 15, a display unit for displaying images generated by said image processing unit, and a sensor disposed on the front face of said display unit for detecting instruction information from the player to said mobile object, wherein said image processing unit has instruction information input judgment means for judging whether said instruction information has been input, and when said instruction information input judgment means judges that instruction information has been input, said target point setting means sets the target point of the movement of said mobile object according to the instruction information detected by said sensor.

18. The image processing unit according to claim 15, wherein said mobile object movement calculation means further comprising: mobile object position calculation means for calculating the position of said mobile object in said three dimensional virtual space according to the target point set by said target point setting means; virtual joint position calculation means for calculating the positions of the virtual joints of said mobile object using said positions sequentially from the virtual joint at the moving direction side; vertex position calculation means for calculating the respective vertex positions of the polygons constituting said mobile object using the positions of said virtual joints; and image data generation means for generating said image data according to said respective vertexes.

19. An image processing method for generating images simulating the moving states of a mobile object by moving said mobile object in a three-dimensional virtual space and displaying said images on a display unit, comprising: target point setting step for setting the target point of the movement of the mobile object by selecting a discrete value from a table where discrete values on positions in said three-dimensional virtual space have been set in advance; mobile object movement calculation step for calculating image data of said mobile object with reference to the target point of the movement of said mobile object; and display control step for controlling the display of the image data of said mobile object calculated in said mobile object movement calculation step.

20. A computer-readable medium for storing computer program instructions for executing, on at least one processor, a method for generating image simulating moving states of a mobile object by moving said mobile object in a three-dimensional virtual space, comprising:

calculating image data for expressing the movement of said mobile object with reference to a target point of the movement of said mobile object;

controlling a display of the image data of said mobile object calculated by said mobile object movement calculation means; and setting the target point of the movement of said mobile object, wherein said target point setting means sets the target point of the movement of said mobile object by selecting a value for position in said three-dimensional virtual space from among discrete values for positions in said virtual space.

* * * * *